July 25, 1961

B. H. PINCKAERS 2,993,995

RADIATION DETECTION SYSTEM

Filed Aug. 3, 1959

2 Sheets-Sheet 1

INVENTOR.
BALTHASAR H. PINCKAERS
BY
Francis A. Sim
ATTORNEY

July 25, 1961

B. H. PINCKAERS 2,993,995

RADIATION DETECTION SYSTEM

Filed Aug. 3, 1959

2 Sheets-Sheet 2

INVENTOR.
BALTHASAR H. PINCKAERS
BY
*Francis A. Sim*
ATTORNEY

United States Patent Office 2,993,995
Patented July 25, 1961

2,993,995
RADIATION DETECTION SYSTEM

Balthasar H. Pinckaers, Edina, Minn., assignor to Minneapolis-Honeywell Regulator Company, Minneapolis, Minn., a corporation of Delaware
Filed Aug. 3, 1959, Ser. No. 831,101
11 Claims. (Cl. 250—83.6)

The present invention is concerned with an improved electric apparatus and particularly with an electric apparatus which is adapted to supply operating voltage to a nonself-quenching condition sensor of the type having a pair of electrodes disposed in an ionizable gaseous medium and to also perform the function of quenching the condition sensor.

Specifically, the present invention contemplates the use of a transistor type pulse stretching circuit whose input is connected to the condition sensor to be controlled thereby and whose output is connected to control the operating voltage applied to the condition sensor to thereby quench, or render inoperative, the condition sensor. The pulse stretching network functions to stretch the pulse of electrical current received from the condition sensor to thereby insure adequate de-ionization of the condition sensor.

This function is accomplished by means of a circuit which connects the condition sensor in series with an impedance and a high voltage source to supply operating voltage to the condition sensor. A pulse stretching transistor network is connected with its input to the condition sensor to be controlled thereby and with its output to the impedance such that upon the condition sensor becoming ionized, the pulse stretching network is controlled to develop a voltage across the impedance means and thereby lower the voltage of the condition sensor to the extinction or quenching voltage.

Figure 1:
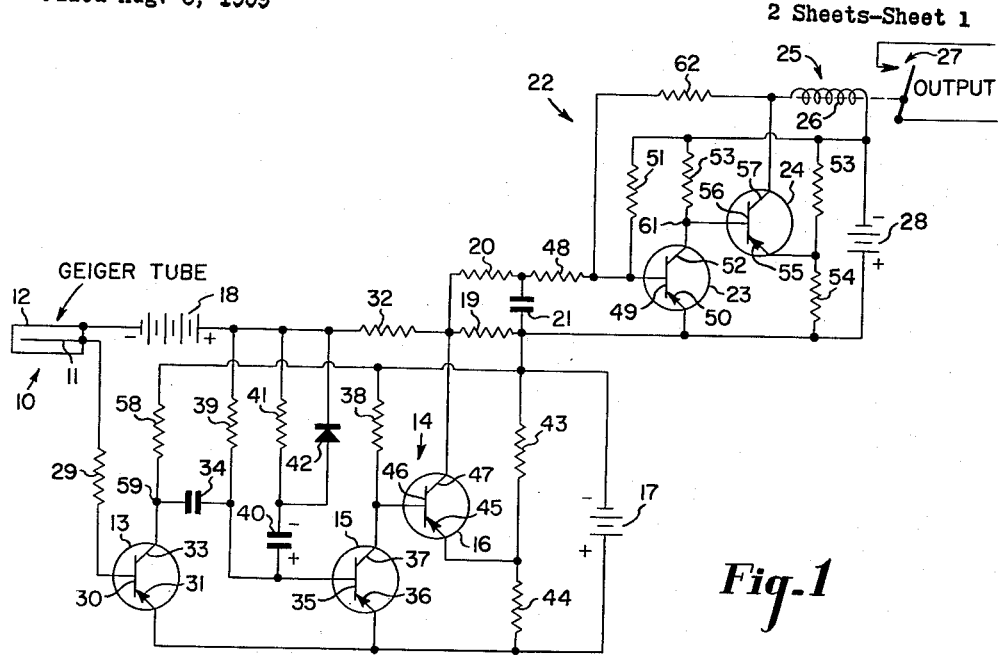
Figure 2:
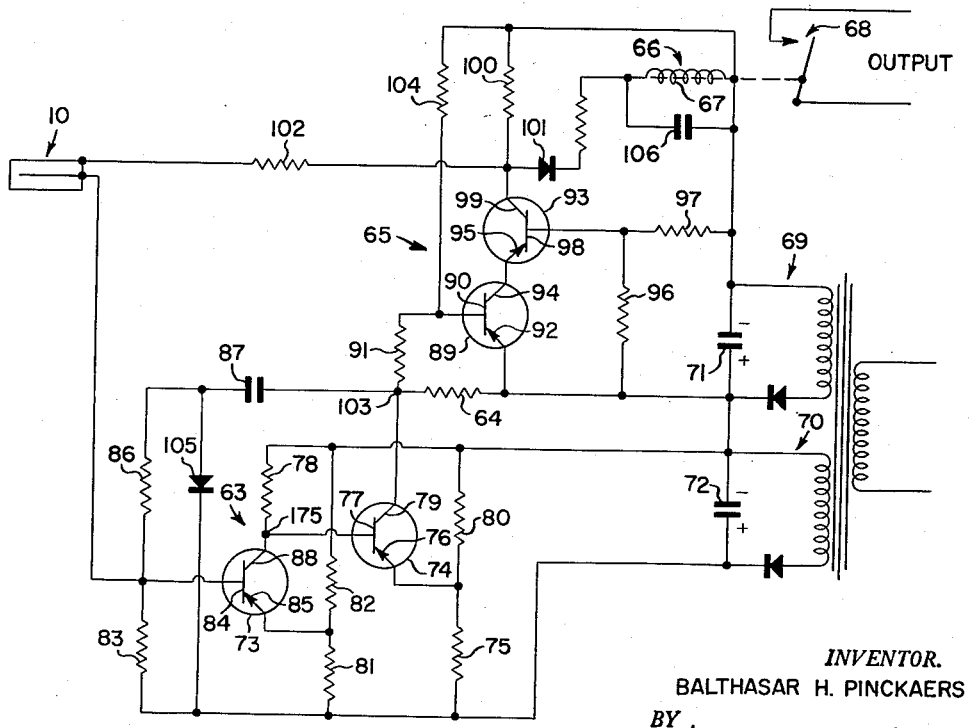
Figure 3:
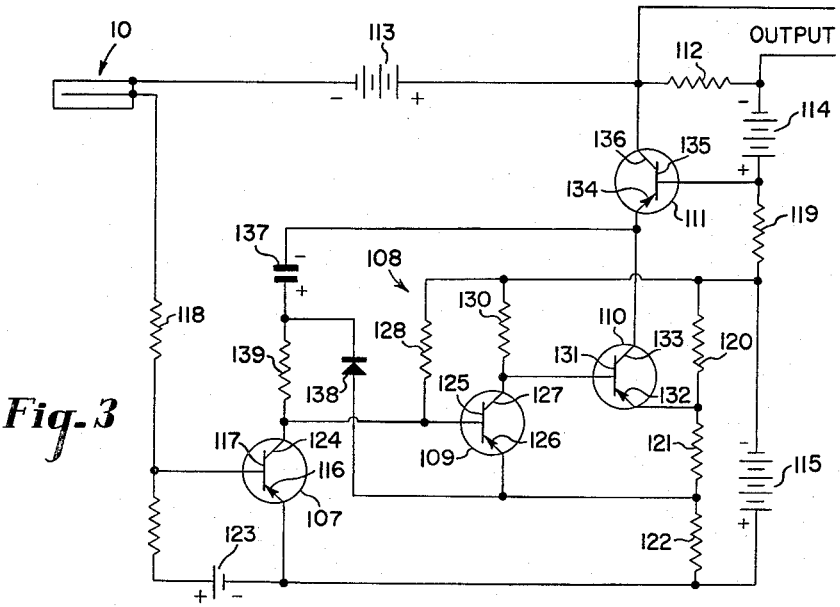
Figure 4:
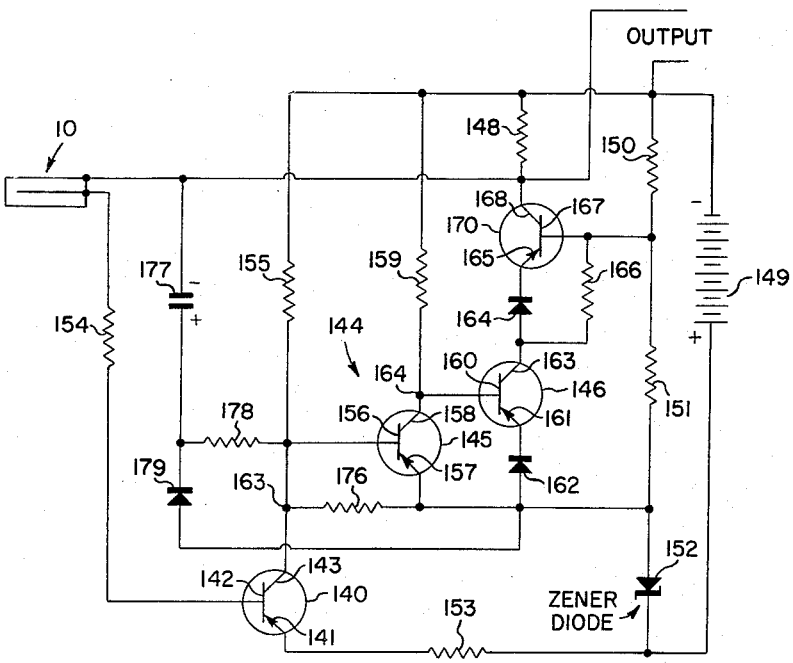

The present invention will be apparent to those skilled in the art upon reference to the following specification, claims, and drawings, of which;

FIGURE 1 is a schematic representation of a first embodiment of the present invention, FIGURE 2 is a schematic representation of a second embodiment of the present invention, FIGURE 3 is a schematic representation of a third embodiment of the present invention, and FIGURE 4 is a schematic representation of a fourth embodiment of the present invention.

FIGURE 1

Referring specifically to FIGURE 1, the reference numeral 10 designates a condition sensor in the form of a Geiger tube having an anode 11 and a cathode 12 disposed in an ionizable gaseous medium. Geiger tube 10 is connected in controlling relation to a first transistor 13 which acts to amplify the current pulses received from the Geiger tube, upon the Geiger tube being subject to an ionizing condition.

Transistor 13 is connected in controlling relation to a pulse stretching monostable transistor network, designated generally by means of the reference numeral 14. This transistor network includes a first transistor 15 and a second transistor 16. This network has a single stable state of operation wherein transistor 15 is conductive and transistor 16 is nonconductive.

Operating voltage for the circuits including transistors 13, 15 and 16 is derived from a first relatively low voltage battery 17. This battery 17 in conjunction with a second battery 18 provides a relatively high operating voltage for Geiger tube 10.

The output of transistor network 14 is developed across an impedance in the form of a resistor 19. This resistor 19 forms a portion of an integrating network including resistors 20 and 48 and a capacitor 21. The capacitor 21 is connected to the input of a further transistor network designated generally by means of the reference numeral 22. This transistor network includes a first transistor 23 and a second transistor 24. The output of transistor network 22 includes a relay 25 having a winding 26 and a normally open switch 27. For purposes of convenience, the output of the apparatus of FIGURE 1 has been merely labeled "output," it being recognized that a great variety of switching functions can be performed by means such as relay 25.

Operating voltage for transistor network 22, as well as relay 25, is derived from the relatively low voltage source 28.

Considering the circuit of FIGURE 1 in greater detail, the anode 11 of Geiger tube 10 is connected through an impedance in the form of resistor 29 to the base electrode 30 of transistor 13. The emitter electrode 31 of this transistor is connected to the positive terminal of battery 17. The cathode of Geiger tube 10 is connected to the negative terminal of battery 18 and, by means of resistors 32 and 19, to the negative terminal of battery 17. Therefore, it can be seen that the voltage supply circuit which applies operating voltage to the electrodes of Geiger tube 10 includes batteries 17 and 18 connected in series, and further includes impedances 19 and 32 connected in series therewith. The voltage magnitude of battery 18 is lower than the extinction voltage of the Geiger tube. However, the algebraic sum of the voltages of batteries 17 and 18 is higher than the firing voltage of the Geiger tube and therefore the Geiger tube becomes ionized and passes current upon being subjected to a condition to which it is sensitive, that is to a condition which causes ionization of the Geiger tube.

Amplifying transistor 13 is substantially cutoff in the standby condition of the apparatus of FIGURE 1, that is the condition in which Geiger tube 10 is operative but does not detect the presence of an ionizing condition. The collector electrode 33 of this transistor is connected through resistor 58 to the negative terminal of battery 17 and therefore an operating voltage is applied to transistor 13. This transistor will therefore be rendered more conductive upon a signal current flowing from the emitter 31 to the base 30, as instituted by ionization of Geiger tube 10.

The output of transistor 13 is capacitor coupled, by means of capacitor 34, to the base electrode 35 of transistor 15. This transistor has its emitter electrode 36 connected to the positive terminal of battery 17 and its collector electrode 37 connected through resistor 38 to the negative terminal of this battery. Transistor 15 is normally in a conducting state as established by a biasing circuit which can be traced from the positive terminal of battery 17 through the emitter to base circuit of transistor 15, resistor 39 in parallel with the series connected capacitor 40 and resistor 41, resistor 32, and resistor 19 to the negative terminal of battery 17. Diode 42 is effective to substantially short resistor 41 during charging of capacitor 40 and, in the standby condition, capacitor 40 is charged to the polarity indicated in FIGURE 1.

Resistors 43 and 44 form a voltage divider network across battery 17 and the voltage developed across resistor 44 is such as to normally maintain transistor 16 in a cutoff condition. The emitter electrode 45 of this transistor is connected to the negative terminal of resistor 44 while the base electrode 46 is connected through the collector to emitter circuit of transistor 15 to the positive terminal of resistor 44. So long as transistor 15 remains conductive, the collector to emitter impedance of this transistor is low and therefore a reverse or cutoff bias is applied between the emitter and base of transistor 16. An operating voltage is applied to the collector electrode 47 of transistor 16 through a circuit including the output impedance 19.

The integrating network including capacitor 21 is connected to the base electrode 49 and the emitter electrode 50 of transistor 23 by means of a circuit including resistor 48. In the standby condition of the apparatus of FIGURE 1, capacitor 21 is discharged since only a very small voltage is developed across resistor 19, due to the fact that transistor 16 is nonconductive. Therefore, transistor 23 is normally conductive in the standby condition of the apparatus of FIGURE 1. This conducting condition is established by means of a biasing circuit which can be traced from the positive terminal of battery 28 through the emitter to base circuit of transistor 23 and resistor 51 to the negative terminal of battery 28. This forward biasing circuit establishes a conducting condition for transistor 23 and therefore an electrical current flows between the emitter and collector electrodes of this transistor.

Resistors 53 and 54 are connected as a voltage divider across battery 28. The emitter electrode 55 of transistor 24 is connected to the negative terminal of resistor 54 and the base electrode 56 of this transistor is connected through the collector to emitter circuit of transistor 23 to the positive terminal of this battery. Therefore, so long as transistor 23 remains conductive, transistor 24 remains non-conductive since its base electrode 56 is connected through the low impedance collector to emitter circuit of transistor 23 to the positive terminal of resistor 54.

The output of the apparatus of FIGURE 1, that is relay 25, is connected to the collector electrode 57 of transistor 24. As will be explained, upon Geiger tube 10 being subjected to an ionizing condition, transistor 24 is rendered conductive and relay winding 26 is energized to close switch 27 to perform a control function.

The above has described the apparatus of FIGURE 1 in the standby condition, that is the condition in which Geiger tube 10 has an operating voltage applied thereto but is not subjected to an ionizing condition. In this case, transistor 13 is substantially nonconductive, transistor 15 is conductive and biases transistor 16 to be nonconductive. With transistor 16 nonconductive, capacitor 21 is substantially discharged and transistor 23 therefore remains conductive to bias transistor 24 nonconductive and maintain relay 25 de-energized.

Assume now that Geiger tube 10 is subjected to a single ionizing condition. In this case, the ionizable gas between electrodes 11 and 12 of the Geiger tube is ionized and a pulse of current flows through the Geiger tube. This current flow path can be traced from the positive terminal of battery 17 through the emitter to base circuit of transistor 13, resistor 29, Geiger tube 10, battery 18, and resistors 32 and 19 to the negative terminal of battery 17. The effect of this current flow is to cause an emitter to base current to flow through transistor 13 and this in turn causes an amplified emitter to collector current to flow in this transistor.

This emitter to collector current flow circuit can be traced through resistor 58. The emitter to collector impedance of transistor 13 now decreases to a lower value and the terminal identified by reference numeral 59 swings in a positive direction, and approaches the potential level of the positive terminal of battery 17. This positive pulse of voltage is applied to the base electrode 35 of transistor 15 through capacitor 34 and is effective to render transistor 15 nonconductive. Upon transistor 15 being rendered nonconductive, its collector electrode 37, and particularly terminal 60, swings in a negative direction and this negative voltage is applied to the base electrode 46 of transistor 16 to render this transistor conductive.

With transistor 16 conductive, a current flow circuit can be traced from the positive terminal of battery 17 through resistor 44, the emitter to collector circuit of transistor 16, and resistor 19 to the negative terminal of battery 17. This current flow developes a voltage across capacitor 19 such that its lefthand terminal is positive with respect to its righthand terminal. This positive voltage existing at the lefthand terminal of resistor 19 is applied in a feedback type circuit through resistors 32 and 39 to the base electrode 35 of transistor 15 to provide a snap-action feature which insures that once transistor 15 begins to cutoff and transistor 16 begins to become conductive, the transition is completed to the point where transistor 15 is completely cutoff and transistor 16 is fully conductive.

As has been mentioned, transistor network 14 is a pulse stretching network. Capacitor 40, and particularly the energy stored therein, is effective to maintain the base electrode 35 of transistor 15 positive for a time period during which capacitor 40 discharges, for example through resistors 39 and 41. So long as a voltage above a given value is maintained on capacitor 40, transistor 15 is maintained nonconductive and transistor 16 is maintained conductive, thus providing a pulse stretching function. As will be explained, this time period determines the quenching time for Geiger tube 10.

The current conduction of transistor 16 through resistor 19 causes substantially the full potential of battery 17 to be developed across resistor 19. It will be remembered that resistor 19 is in the supply circuit for Geiger tube 10 and therefore the effect of the voltage developed across resistor 19 is to reduce the operating voltage of Geiger tube 10 to substantially that of battery 18. Also as has been mentioned, the voltage of battery 18 is below the extinction voltage of Geiger tube 10 and therefore the Geiger tube is extinguished or quenched. So long as transistor 16 remains conductive, the only voltage applied to Geiger tube 10 is that of battery 18 and therefore the pulse stretching time, as determined by the means including capacitor 40, determines the quenching time of the Geiger tube and insures that the Geiger tube is completely de-ionized or quenched.

The above operation has described a single ionizing event which causes a single pulse of current to flow through the Geiger tube 10. This may be a single random background ionizing event or it may be the first of a steady and frequent series of ionizing events which pass through the Geiger tube 10 and which are caused by a condition to which the Geiger tube is sensitive, for example a flame in the area monitored by the Geiger tube. In the event that only a random and infrequent background count is received, the integrating capacitor 21 is not charged appreciably. However, in the event of sustained counting rates indicative of the presence of a condition to which the Geiger tube is sensitive, capacitor 21 is charged such that its upper plate is positive with respect to its lower plate.

Considering now that Geiger tube 10 is in fact subjected to a condition to which it is sensitive, the voltage developed across capacitor 21 is applied to the base and emitter electrodes 49 and 50 of transistor 23 and places a positive voltage on the base 49 to thereby render this transistor nonconductive. Upon transistor 23 being rendered nonconductive, its collector electrode 52, and particularly terminal 61, becomes negative and this negative voltage is applied to the base electrode 56 of transistor 24 to render this transistor conductive. The current flow path for transistor 24 can be traced from the positive terminal of battery 28 through resistor 54, the emitter to collector circuit of transistor 24, and winding 26 of relay 25 to the negative terminal of battery 28. Therefore, winding 26 of relay 25 is energized and the switch 27 is closed. A resistor 62 is provided and is connected from the base electrode of transistor 23 to the collector electrode of transistor 24. This resistor acts in a feedback circuit to provide a snap action, much as described in connection with the network 14. This feedback circuit insures that once transistor 23 begins to cutoff, the action is completed to where transistor 23 is completely nonconductive and transistor 24 is substantially conductive.

The above explanation has traced the operation of the apparatus of FIGURE 1 through a cycle of operation of network 14 and has shown how upon Geiger tube 10 being subjected to a continuous and frequent series of ionizing events, network 22 is maintained in a condition wherein relay 25 energizes. It will of course be recognized that upon Geiger tube 10 being quenched, the Geiger tube is maintained in a quenched condition for a given period of time during which the capacitor 40 discharges. Upon capacitor 40 being discharged to a given extent, the monostable network 15—16 reverts to its stable condition wherein transistor 15 is conductive and transistor 16 is nonconductive. During, or just following, the return to the stable condition capacitor 40 is recharged very rapidly through diode 42 to "ready" it again for the next pulse-stretching period should the Geiger tube fire immediately again. The voltage previously developed across resistor 19 now no longer exists, and once again an operating voltage is applied to the Geiger tube 10, the operating voltage being the algebraic sum of batteries 17 and 18. The Geiger tube, upon being subjected to a condition to which it is sensitive, now again becomes ionized and the cycle is repeated. The monostable network 14 continuously cycles between its stable and unstable conditions so long as the Geiger tube 10 is subjected to the conditions to which it is sensitive.

FIGURE 2

Referring now to FIGURE 2, this figure shows a second embodiment of the present invention having a somewhat different method of supplying operating voltage to the Geiger tube and having a somewhat different method of providing the pulse stretching feature. Here again, the reference numeral 10 designates a condition sensor in the form of a Geiger tube. The reference numeral 63 designates a monostable pulse stretching transistor network. The output of this monostable transistor network is developed across an impedance 64 which is connected to the input of a further transistor network identified generally by means of the reference numeral 65. The output of transistor network 65 includes a relay 66 having a winding 67 and a normally open switch 68.

As with FIGURE 1, the apparatus of FIGURE 2 receives its operating voltage from a pair of relatively low voltage sources identified generally by means of the reference numerals 69 and 70. However, in this case, the low voltage sources are derived from an alternating source of voltage, not shown, in conjunction with rectifying means to charge capacitors 71 and 72 to the polarity indicated in the figure.

The low voltage source 72 supplies operating voltage to the monostable transistor network 63 including transistors 73 and 74. The stable condition of network 63 is such that transistor 73 is normally nonconductive and transistor 74 is normally conductive. The stable condition of transistor 74 is established by means of a biasing circuit which can be traced from the positive terminal of capacitor 72 through resistor 75, emitter 76 and base 77 of transistor 74, and resistor 78 to the negative terminal of capacitor 72. With transistor 74 conductive, an emitter to collector current flows from the emitter 76 to the collector 79 and this current flow circuit is completed through resistor 64 to the negative terminal of battery 72. Since the impedance of resistor 75 is relatively small compared to that of resistor 80, substantially the full voltage of capacitor 72 is dropped across resistor 64, the lefthand terminal of this resistor being positive.

The stable nonconducting state for transistor 73 is established by means including resistors 81 and 82 which are connected to form a voltage divider across capacitor 72. The voltage developed across resistor 81 is such that its lower terminal is positive with respect to its upper terminal. The lower terminal of this resistor is connected through a further resistor 83 to the base electrode 84 of transistor 73 while the emitter electrode 85 of this transistor is connected to the upper terminal of resistor 81. Resistor 83 is connected in series with a resistor 86 and a capacitor 87 to the lefthand terminal of resistor 64. Since substantially the full voltage of capacitor 72 is now dropped across resistor 64, little or no voltage exists across resistors 83 and 86 in series and therefore the voltage present across resistor 81 is effective to bias transistor 73 substantially to cutoff. Therefore, no current flows from its emitter to its collector electrode 88.

The voltage present across resistor 64, due to conduction of transistor 74, is effective to bias transistor 89 substantially to cutoff. The base electrode 90 of this transistor is connected through a resistor 91 to the lefthand or positive terminal of resistor 64 while the emitter electrode 92 of this transistor is connected to the negative terminal of resistor 64. This circuit connection maintains transistor 89 nonconductive. Transistor 89 is connected in cascade fashion with a second transistor 93, the collector 94 of transistor 89 being connected to the emitter 95 of transistor 93. Therefore, since no emitter to collector current flows in transistor 89 at this time, no emitter current can flow for transistor 93 and therefore this transistor is also substantially cutoff. Operating voltage for transistors 89 and 93 is derived from capacitor 71 by means of a voltage divider including resistors 96 and 97. The base electrode 98 of transistor 93 is connected to the terminal connecting resistors 96 and 97 while its collector electrode 99 is connected through a resistor 100 to the negative terminal of capacitor 71. It can be seen upon reference to FIGURE 2 that the winding 67 of relay 66 is connected in series with a diode 101 and this series circuit is connected in parallel with resistor 100 so that winding 67 is energized in accordance with the voltage present across resistor 100. At this time however transistor 93 is nonconductive and therefore substantially no voltage exists across resistor 100 and relay 66 is de-energized.

The energizing circuit for Geiger tube 10 can be traced from the positive terminal of capacitor 72 through resistor 83, Geiger tube 10, resistor 102, resistor 100, and capacitor 71 to the negative terminal of capacitor 72. From this circuit it can be seen that the operating voltage applied to Geiger tube 10 is the algebraic sum of the relatively low voltage sources comprising capacitors 71 and 72. This algebraic sum is of a high enough value to provide a relatively high operating voltage to the Geiger tube. However, since the transistor networks 63 and 65 are associated each with a separate one of these low voltage sources, a relatively low voltage is applied as operating voltage to the transistor networks.

The above explanation of FIGURE 2 deals with the apparatus in the standby condition, that is the condition in which an operating voltage is applied to Geiger tube 10 and in which the Geiger tube is not subjected to a condition to which it is sensitive. In this standby condition, transistor 73 is nonconductive and transistor 74 is conductive. Transistor 74 in its conductive condition maintains transistors 89 and 93 nonconductive and therefore relay 66 is de-energized. Also, since transistor 74 is conductive, substantially the full voltage of capacitor 72 is dropped across resistor 64 and therefore a very low voltage exists between the terminal 103 and the lower terminal of capacitor 72. Therefore, substantially no voltage is applied to the series circuit including resistors 83 and 86 and capacitor 87. Capacitor 87 is therefore substantially in an uncharged condition when the apparatus of FIGURE 2 is in the standby condition.

Assume now that Geiger tube 10 is subjected to a single ionizing condition which causes the ionizable gas to become ionized and therefore causes a pulse of current to flow between the electrodes thereof. This current flow circuit can be traced from the lower plate of capacitor 72, through resistor 83 in parallel with the series connected resistor 81 and emitter to base circuit of transistor 73, Geiger tube 10, and resistors 102 and 100 to the upper terminal of capacitor 71. From this above traced circuit it can be seen that this current pulse applies an input signal to transistor 73 which renders this transistor conductive. With transistor 73 rendered conductive, an emitter to collector current flows for this transistor through resistors 81 and 78. The potential of collector electrode 88, moves in a positive direction. This positive voltage is applied to the base electrode 77 of transistor 74 and renders this transistor substantially nonconductive.

With transistor 74 now nonconductive, the voltage previously present across resistor 64 no longer exists and therefore transistor 89 is rendered conductive by means of a circuit which can be traced from the positive terminal of capacitor 71 through the emitter to base circuit of this transistor, and resistor 104 to the negative terminal of capacitor 71. As transistor 89 is rendered conductive, an emitter to base current flows in transistor 93 through resistor 97 and therefore transistor 93 is rendered conductive. The emitter to collector current flow circuit for transistor 93 can be traced from the positive terminal of capacitor 71 through the emitter to collector circuit of transistor 89, the emitter to collector circuit of transistor 93, and resistor 100 to the negative terminal of capacitor 71. Since the voltage drop existing between the emitter and collector electrodes of transistor 89 and 93 is relatively small, substantially the full voltage of capacitor 71 now appears across resistor 100, the polarity of this voltage being such that the lower terminal of this resistor is positive. This voltage across resistor 100 is applied to winding 67 of relay 60 through diode 101. As with the apparatus of FIGURE 1, relay 66 and its switch 68 can be connected to provide a variety of control functions and therefore the output has been simply labeled as "output."

It will be recalled that resistor 100, which now has a voltage thereacross substantially equal to the voltage of capacitor 71, lies in series with capacitors 71 and 72 in the voltage supply circuit for Geiger tube 10. Therefore, upon transistors 89 and 93 being rendered conductive, the voltage applied to the electrodes of Geiger tube 10 is substantially reduced and is in fact reduced to a voltage below the extinction potential of the Geiger tube. Therefore, the Geiger tube de-ionizes. The de-ionization of Geiger tube 10 removes the control signal from the input of transistor 73, which control signal was initially effective to cause transistor 73 to become conductive. However, transistor 73 is now maintained in a conducting condition by means of a current flow which is now effective to charge capacitor 87.

It will be remembered that capacitor 87 is in a discharged condition during the standby condition of the apparatus since substantially the complete voltage existing on capacitor 72 is dropped across resistor 64. However, upon transistor 74 being rendered nonconductive this is no longer true and the series circuit including resistors 83 and 86 and including capacitor 87 now has a voltage applied to it which is substantially equal to that of the capacitor 72. Therefore, a current flow circuit can be traced from the positive terminal of capacitor 72 through resistor 83, resistor 86, capacitor 87 and resistor 64 to the negative terminal of capacitor 72. A current flows in this circuit until capacitor 87 becomes charged to substantially the voltage existing on capacitor 72. So long as this current flows, a voltage is developed across resistor 83 such that its lower terminal is positive with respect to its upper terminal. The lower terminal of resistor 83 is connected to the emitter electrode 85 of transistor 73 and therefore this transistor is maintained in a conducting condition independent of the state of conduction of Geiger tube 10. Capacitor 87 and its associated circuitry functions as a pulse stretching circuit and maintains network 63 in the unstable condition wherein transistor 73 is conductive and transistor 74 is nonconductive. This circuit is maintained in this condition for a given time period and during this time period the transistors 89 and 93 are conductive to maintain a reduced voltage on Geiger tube 10 to insure that the Geiger tube is adequately de-ionized or quenched.

At the end of this time interval, the normal biasing circuits for network 63 are effective to revert this network to its stable condition wherein transistor 73 is nonconductive and transistor 74 is conductive. When this occurs, the apparatus of FIGURE 2 reverts to its standby condition and an operating voltage is again applied to Geiger tube 10. Again during this transition, capacitor 87 is rapidly discharged through diode 105, thereby readying capacitor 87 for the next pulse-stretching action. This happens in a very short time. Therefore when "counting" at saturated rate the "on" time is very much longer than "off" type resulting in a higher average output.

The above explanation has traced the operation of the apparatus of FIGURE 2 through a single ionizing event for Geiger tube 10, such as would exist for an infrequent random count or ionizing event. In the event of the infrequent type of random count, capacitor 106 which is connected in parallel with winding 67 of relay 66 remains in a substantially discharged condition and therefore the relay winding 67 is not operatively energized. However, in the event of a sustained count by the Geiger tube 10, as occurs upon the Geiger tube being subjected to a condition to which it is sensitive, the networks 63 and 65 cycle between their standby and quenching conditions at a regular rate and regular pulses of energy are applied to the capacitor 106 to charge this capacitor and therefore relay winding 67 is operatively energized to close the switch 68.

FIGURE 3

Referring now to FIGURE 3, the reference numeral 10 again identifies a condition sensor in the form of a Geiger tube which is connected in controlling relation to an amplifying stage including a transistor 107. This transistor 107 is connected in controlling relation to a monostable pulse stretching transistor network identified generally by the reference numeral 108. The transistor network 108 includes a first transistor 109 and a second transistor 110. Transistor 110 is connected in controlling relation to a further transistor 111 and the output of this transistor 111 includes an impedance 112 to which a circuit is connected which is labeled "output."

Operating voltage for the apparatus of FIGURE 3 is derived from three low voltage sources, identified by the reference numerals 113, 114 and 115.

The low voltage battery 115 supplies operating voltage to transistor network 108. Battery 114 supplies operating voltage to transistor 111 and the series connected batteries 113, 114 and 115 supply operating voltage to the electrodes of Geiger tube 10. The circuit which supplies operating voltage to the Geiger tube can be traced from the positive terminal of battery 115 through the emitter 116 and base 117 of transistor 107, resistor 118, Geiger tube 10, battery 113, resistor 112, battery 114, and resistor 119 to the negative terminal of battery 115. From this circuit it can be seen that the three batteries are connected in series such that the algebraic sum of their voltages are applied to the Geiger tube 10 to apply a relatively high operating voltage to the Geiger tube.

Referring now to the specific circuits in greater detail, the series connected resistors 120, 121 and 122 form a voltage divider across battery 115. Transistor 107 is biased to be normally nonconductive by means of a further battery 123 which is connected such that the base electrode 117 transistor 107 is positive with respect to the emitter electrode. The collector electrode 124 of this transistor is connected to the base electrode 125 of transistor 109 and the emitter electrode 126 of this transistor is connected to the upper terminal of resistor 122. Transistor 109 is normally in a conducting condition which is established by means of a biasing circuit which can be traced from the upper terminal of resistor 122 through the emitter 125 and base 127 of transistor 109 and resistor 128 to the upper terminal of resistor 120. A current therefore flows from its emitter 126 to its collector 129 and through a resistor 130 to the upper terminal of resistor 120. The base electrode 131 of transistor 110 is directly connected to the collector of transistor 109 while the emitter electrode 132 of transistor 110 is connected to the upper terminal of resistor 121. Therefore, the voltage present across resistor 121 acts as a bias voltage to maintain transistor 110 substantially cutoff so long as transistor 109 remains conductive.

The output circuit of transistor 110, which includes the collector electrode 133, can be traced from the upper terminal of resistor 121 through the emitter to collector circuit of transistor 110, the emitter 134 and base 135 of transistor 111, and resistor 119 to the upper terminal of resistor 120. Since transistor 110 is normally in a cutoff condition, transistor 111 is also normally cutoff and an output current does not flow from the collector electrode 136 of this transistor.

The reference numeral 137 identifies a capacitor which functions as a pulse stretching capacitor in the transistor network 108. In the standby condition of the apparatus of FIGURE 3, capacitor 137 is normally charged to the polarity indicated in FIGURE 3. This capacitor charges very rapidly through a diode identified by the reference numeral 138.

The description of the apparatus of FIGURE 3 thus far has explained the mode of operation of the apparatus when in the standby condition, that is the condition in which the Geiger tube 10 is not subjected to an ionizing condition. In this condition, an operating voltage is applied to the electrodes of Geiger tube 10, transistor 107 is substantially nonconducting, transistor 109 is in a conducting condition and biases transistor 110 to be in a nonconducting condition. Furthermore, transistor 111 is in a nonconducting condition.

Assume now that the Geiger tube 10 is subjected to an ionizing condition. A current flow circuit can be traced from the positive terminal of battery 115 through the emitter to base circuit of transistor 107, resistor 118, Geiger tube 10, battery 113, resistor 112, battery 114, and resistor 119 to the negative terminal of battery 115. This current flows in such a direction as to place transistor 107 in a conducting condition. The conduction of transistor 107 can be traced from the lower terminal of resistor 122 through the emitter to collector circuit of transistor 107, and the base to emitter circuit of transisor 109 to the upper terminal of resistor 122.

This current flow represents a reverse current to the input of transistor 109 and renders this transistor nonconducting. Upon transistor 109 being rendered nonconductive, the potential level of its collector electrode 129 increases in a negative direction and this negative voltage is applied to the base electrode 131 of transistor 110 to render this transistor conductive.

The conduction circuit for transistor 110 can be traced from the upper terminal of resistor 121 through the emitter to collector circuit of transistor 110, the emitter to base circuit of transistor 111, and resistor 119 to the negative terminal of battery 115. Resistors 121 and 122 are relatively small compared to resistor 120 and therefore substantially the full voltage of battery 115 appears across resistor 120. Since the emitter to collector impedance of transistor 110 and the emitter to base impedance of transistor 111 is relatively small, the voltage drop across resistor 119 now becomes approximately equal to the voltage of battery 115.

Furthermore, the emitter to base current which flows in transistor 111 renders this transistor conductive and a current flow circuit can be traced from the positive terminal of battery 114 through base to collector of transistor 111, resistor 112 to the negative terminal of battery 114. In this circuit, substantially all of the voltage of battery 114 is dropped across the series resistor 112 and therefore the only remaining voltage for operation of Geiger tube 10 is that of battery 113. The voltage magnitude of battery 113 is so selected that the voltage now applied to the Geiger tube is insufficient to maintain the Geiger tube ionized and the tube becomes de-ionized or quenched.

As soon as the Geiger tube becomes quenched, the input signal to transistor 107 no longer exists and this transistor once again reverts to its nonconducting state. This tends to cause the monostable network 108 to revert to its stable condition wherein transistor 109 is conductive. However, capacitor 137, and the charge thereon, is now effective through a resistor 139 to maintain a positive voltage on the base electrode 125 of transistor 109 and thereby maintain monostable network 108 in its unstable condition. So long as this network is maintained in its unstable condition, transistors 110 and 111 are maintained conductive and the Geiger tube is not supplied with an operating voltage. This insures that the Geiger tube is adequately de-ionized or quenched.

After a time period, capacitor 137 is discharged to the point where the normal biasing circuit for transistor 109 is effective to again place the monostable network 108 in its stable condition. When this occurs, both transistors 110 and 111 are again rendered nonconductive and therefore an operating voltage is again applied to the Geiger tube 10. Furthermore, capacitor 137 is immediately recharged through diode 138 and the entire apparatus of FIGURE 3 is again placed in its standby condition. Should the Geiger tube 10 be subjected to a condition to which it is sensitive, the Geiger tube is again ionized and is subsequently quenched. In this manner, the monostable network 108 cycles between its stable and its unstable condition and the resistor 112 has a cyclic voltage applied thereto. The output which is taken across resistor 112 may then be utilized to perform a number of control functions. Furthermore, integrating means such as disclosed in FIGURE 1 or relay means such as disclosed in FIGURE 2 could be utilized to be controlled by the voltage across resistor 112.

FIGURE 4

Referring now to FIGURE 4, the reference numeral 10 again identifies the Geiger tube. This Geiger tube is connected in controlling relation to an amplifying transistor 140 having an emitter 141, a base 142 and a collector 143.

Transistor 140 is connected in controlling relation to a transistor type monostable pulse stretching network identified generally by means of the reference numeral 144. The network 144 includes three transistors, 145, 146 and 170. The output of network 144 includes an impedance 148 to which the conductors labeled "output" are attached.

Operating voltage for the apparatus of FIGURE 4 is derived from a high voltage source in the form of a battery 149. The resistors 150 and 151 and the Zener diode 152 form a voltage divider network connected across battery 149.

Geiger tube 10 receives its operating voltage from the full battery 149 and this can be seen by tracing the circuit from positive terminal of battery 149 through resistor 153, the emitter to base circuit of transistor 140, resistor 154, Geiger tube 10, and resistor 148 to the negative terminal of battery 149.

Transistor 140, which is preferably a silicon type transistor having low leakage current characteristics, receives its operating voltage from the voltage developed across the Zener diode 152. Transistor 145 has its base electrode 156 directly connected to the collector electrode 143 of transistor 140. The emitter electrode 157 of transistor 145 is connected to the bottom terminal of resistor 151 while its collector electrode 158 is connected through resistor 159 to the upper terminal of resistor 150. The base electrode 160 of transistor 146 is connected to the collector electrode 158 of transistor 145 and the emitter electrode 161 of transistor 146 is connected to the bottom terminal of resistor 151 through a diode 162. The collector electrode 163 of this transistor is connected through a further diode 164 to the emitter electrode 165 of transistor 170. This collector electrode 163 is also connected through a resistor 166 to the base electrode 167 of transistor 146. The base electrode 167 is connected to the upper terminal of resistor 151 while the collector electrode 168 of this transistor is connected through resistor 148 to the upper terminal of resistor 150.

Referring now to the operation of the apparatus of FIGURE 4, assume that a single ionizing event causes ionization of the gas of the condition sensor 10. A current flow circuit can be traced from the positive terminal of battery 149 through resistor 153, the emitter to base circuit of transistor 140, resistor 154, sensor 10, and resistor 148 to the negative terminal of battery 149. This current flow circuit is such as to place a forward bias on transistor 140 and render this transistor conductive through a circuit which can be traced from the bottom terminal of diode 152 through resistor 153, the emitter to collector circuit of transistor 140, and resistor 176 in parallel with the base to emitter circuit of transistor 145 to the upper terminal of diode 152. As a result, transistor 145 is rendered nonconductive. Upon this transistor being rendered nonconductive, terminal 164 becomes more negative. This voltage pulse is applied to the base electrode 160 of transistor 146 to render this transistor conductive. The current flow path for transistor 163 can be traced from the lower terminal of resistor 151 through diode 162, emitter to collector circuit of transistor 146, diode 164, and the emitter to base circuit of transistor 170, to the upper terminal of resistor 15. This current flow renders transistor 170 conductive and a current flow can also be traced from the bottom terminal of resistor 151 through diode 162, the emitter to collector circuit of transistor 146, diode 164, the emitter to collector circuit of transistor 170, and resistor 148 to the upper terminal of resistor 150.

The conduction of transistors 146 and 170 causes substantially the full voltage drop appearing across resistors 150 and 151 to now appear also across resistor 143. This resistor is in series with a voltage supply circuit for the condition sensor 10 and therefore the voltage applied to the condition sensor is appreciably reduced, and actually reduced to the extent that the gas between the electrodes of the condition sensor de-ionizes and the tube becomes nonconductive.

Capacitor 177, diode 179 and resistor 178 function to cause network 144 to act as a pulse stretching means, as described above. Capacitor 177 is normally charged as shown and upon transistor 145 being rendered nonconductive, the charge on capacitor 177 is effective to maintain the transistor nonconductive for a given time period. Diode 179 is provided to substantially immediately recharge capacitor 177 so as to permit very short "off" periods during steady condition sensing and to prevent refiring of Geiger tube before capacitor 177 is substantially recharged. Also, the voltage to the Geiger tube 10 is not re-applied as a step function which could possibly result in cycling on the very small leadwire and internal tube capacity. The tube voltage is re-applied as a voltage which increases over a short time period, say 5 milliseconds, until the tube voltage again reaches its firing value, at which value the tube is again operative to sense an ionizing event.

From the above description it can be seen that I have provided an improved electric apparatus wherein a high voltage condition sensor is controlled by means of low voltage devices, that is transistors. Specifically, circuit means are provided whereby a high voltage condition sensor is connected in series with an impedance and a voltage source. Transistor means are connected to be controlled by the condition sensor and to in turn control the voltage drop across the impedance such that upon the condition sensor becoming ionized, the transistor means is effective to cause a relatively high voltage drop to appear across the impedance and thereby the condition sensor is quenched. Other modifications of the present invention will be apparent to those skilled in the art and it is intended that the scope of the present invention be limited solely by the scope of the appended claims.

I claim as my invention:

1. Electric apparatus comprising; a nonself-quenching condition sensor, a source of operating voltage therefor, an impedance, circuit means connecting said condition sensor, said source of voltage and said impedance in circuit to provide operating voltage for said condition sensor, said condition sensor being rendered conductive upon being subjected to a condition to which it is sensitive and remaining in its conductive state until it is quenched; a transistor network, input and output means for said transistor network, means connecting the input means of said transistor network to said condition sensor such that said condition sensor is effective upon becoming conductive to control said transistor network and cause said transistor network to shift from a first state of operation to a second state of operation; means connecting the output means of said transistor network to said impedance such that said transistor network when in said second state of operation is effective to cause a voltage to be developed across said impedance which opposes said source of voltage and thereby reduces the operating voltage of said condition sensor to render said condition sensor nonconductive; timing means connected in controlling relation to said transistor network to maintain said transistor network in said second state of operation for a relatively long time period to insure that said condition sensor is rendered nonconductive; and means connected to the output means of said transistor network and adapted to respond to a condition wherein said transistor network cycles between said first and second states of operation as a result of said condition sensor being continuously subjected to a condition to which it is sensitive.

2. Electric apparatus comprising; a nonself-quenching condition sensor of the type having a pair of electrodes disposed in an ionizable gaseous medium, voltage supply means, impedance means, circuit means connecting said condition sensor, said voltage supply means and said impedance means in circuit to apply an operating voltage to said condition sensor, said condition sensor being effective upon being subjected to an ionizing condition to pass current between the electrodes thereof and to maintain the conduction of said current until the voltage across said electrodes is dropped to at least the extinction potential of said sensor; a monostable transistor network having a first stable condition and having a second unstable condition to which said network may be triggered, input means and output means for said transistor network; circuit means connecting the input means of said transistor network to said condition sensor such that an input signal is applied to said transistor network upon said sensor becoming ionized, to thereby cause said transistor network to shift from said stable to said unstable condition of operation; circuit means connecting said impedance to the output means of said transistor network in a manner to develop a voltage across said impedance means when said transistor network is operating in said unstable condition, the voltage developed across said impedance means being effective to reduce the voltage applied to the electrodes of said condition sensor and thereby quench said condition sensor; and timing means connected in controlling relation to said transistor network and effective upon said transistor network being placed in said unstable condition to maintain operation of said transistor network in said unstable condition for a relatively long time period to insure complete de-ionization of said condition sensor.

3. Electric apparatus comprising; nonself-quenching Geiger tube condition sensing means, a source of operating voltage for said Geiger tube condition sensing means, impedance means, circuit means connecting said Geiger tube, said source of voltage and said impedance means in circuit to apply an operating voltage to said Geiger tube, said Geiger tube being effective upon being subjected to an ionizing condition to cause a current to flow, said current flow being sustained until such time as the operating voltage of said Geiger tube is reduced to at least the extinction potential of said Geiger tube; a pulse stretching network having an input and an output and being effective upon an input current being applied to the input thereof to stretch said input current in time duration and supply an output signal at the output thereof; circuit means connecting said Geiger tube in controlling relation to the input of said network to apply an input current thereto upon said Geiger tube experiencing an ionizing condition, and further means connected to the output of said network and controlled thereby, said further means being connected to said impedance and being effective to develop a voltage across said impedance of a sufficient magnitude and of a sufficient time duration to effect quenching of said Geiger tube.

4. Electric apparatus comprising; nonself-quenching Geiger tube condition sensing means, impedance means, a source of voltage, circuit means connecting said Geiger tube, said impedance means and said source of voltage in a series circuit to apply an operating voltage to said Geiger tube, said Geiger tube being effective upon being subjected to an ionizing condition to cause a pulse of current to flow, said current being sustained until the operating voltage of said Geiger tube is reduced to at least the extinction voltage of said Geiger tube to thereby quench said Geiger tube, a monostable network having a first stable condition and a second unstable condition, input means for said network, output means for said network including means connected to said impedance means; circuit means connecting the input means of said network to said Geiger tube such that said Geiger tube is connected in controlling relation to said network and applies a control current to the input thereof upon said Geiger tube experiencing an ionizing condition, said Geiger tube thereby being effective to cause said network to assume said unstable condition of operation and to apply a voltage to said impedance of sufficient magnitude to reduce the operating voltage of said Geiger tube to said extinction potential; and timing means connected in controlling relation to said network and effective to maintain said network in said unstable condition of operation for a relatively long time period sufficient to insure quenching of said Geiger tube.

5. Electric apparatus comprising; a relatively high voltage nonself-quenching condition sensor of the type having a pair of electrodes disposed in an ionizable gaseous medium, impedance means, a plurality of relatively low voltage sources, circuit means connecting said condition sensor, said impedance means and said plurality of low voltage sources in a series circuit to apply a relatively high operating voltage to said condition sensor, said condition sensor then being effective to become conductive upon being subjected to an ionizing condition and to subsequently become nonconductive upon the voltage thereacross being reduced to at least the extinction voltage of said condition sensor; a monostable pulse stretching transistor network having an input and an output, means connecting the input of said transistor network to said condition sensor such that said transistor network is controlled from its stable to an unstable condition of operation upon said condition sensor being rendered conductive and is maintained in said unstable condition for a relatively long time duration, means connecting the output of said transistor network to said impedance means and to at least one of said low voltage sources as a source of operating voltage for said transistor network, said network functioning to develop a relatively low voltage across said impedance means in opposition to the voltage of said low voltage sources upon said transistor network assuming said unstable condition of operation, said transistor network thereby being effective to reduce the voltage applied to said condition sensor to at least said extinction voltage and to maintain this reduced voltage for a relatively long time duration to thereby quench said condition sensor.

6. Electric apparatus comprising; a nonself-quenching condition sensor of the type having a pair of electrodes disposed in an ionizable gaseous medium, said condition sensor requiring a relatively high operating voltage and being effective to conduct current between the electrodes thereof upon being subjected to a condition which ionizes the gas between the electrodes, the current conduction of said condition sensor being maintained until the operating voltage applied to the electrodes thereof is reduced to at least the extinction potential whereupon the gas de-ionizes; impedance means, a plurality of relatively low voltage sources, circuit means connecting said condition sensor, said impedance means and said plurality of low voltage sources in a series circuit to apply a relatively high operating voltage to said condition sensor; a monostable pulse stretching network having low voltage transistor means, an input and an output for said monostable network, means connecting the input of said monostable network to said condition sensor such that said monostable network is controlled from a stable operating condition to an unstable operating condition upon the condition sensor being rendered conductive due to an ionizing condition, said monostable network being maintained in said unstable condition of operation for a relatively long time period independent of the time duration of conduction of said condition sensor; means connecting the output of said monostable network to said impedance means and to at least one of said low voltage sources to thereby apply a low operating voltage to said monostable network, said monostable network being effective upon operation in said unstable condition for said relatively long time period to develop a relatively low voltage across said impedance means in opposition to the voltage of said low voltage sources and of a magnitude effective to reduce the voltage applied to said condition sensor to at least said extinction potential and thereby cause de-ionization of the gas of said condition sensor.

7. Electric apparatus comprising; a nonself-quenching condition sensor of the type requiring a relatively high operating voltage, a first and a second low voltage source, impedance means, circuit means connecting said condition sensor, said impedance means and said first and second low voltage sources in series to thereby apply a relatively high operating voltage to said condition sensor; a pulse stretching network having low voltage transistor means connected to said first low voltage source as a source of operating voltage for said transistor means and having an input and an output, circuit means connecting the output of said network in circuit with said impedance means, circuit means connecting the input of said network in circuit with said condition sensor, said condition sensor being effective upon being subjected to a condition to which it is sensitive to apply an input signal to the input of said network to thereby develop a low magnitude control voltage having a relatively long time duration across said impedance means in opposition to the voltage of said low voltage sources, the magnitude of the control voltage being sufficient to reduce the operating voltage applied to said condition sensor for said relatively long time duration to thereby quench said condition sensor; and output means controlled by said network.

8. Electric apparatus comprising; a nonself-quenching Geiger tube of the type requiring a relatively high operating voltage, a first and a second low voltage source, impedance means, circuit means connecting said Geiger tube, said impedance means and said first and second low voltage sources in a series circuit to thereby apply a relatively high operating voltage to said Geiger tube; a first transistor having an input electrode, an output electrode, and a common electrode, circuit means connecting the input and common electrode of said first transistor in circuit with said Geiger tube, further circuit means connecting the input and the output electrodes of said first transistor in circuit with one of said low voltage sources to thereby apply a low operating voltage to said first transistor; a second transistor having an input electrode, an output electrode, and a common electrode, biasing circuit means connecting the input and common electrodes of said second transistor in circuit with said one source of voltage to thereby apply a biasing current to said second transistor to render said second transistor normally conductive, circuit means connecting the output and common electrodes of said second transistor to said one source of voltage to apply a relatively low operating voltage thereto; a third transistor having an input electrode, an output electrode and a common electrode, voltage dividing means connected to said one voltage source, circuit means connecting the common electrode of said third transistor to an intermediate point of said voltage divider means, further circuit means connecting the input electrode of said third transistor directly to the output electrode of said second transistor to thereby bias said third transistor to cutoff so long as said second transistor remains conductive, circuit means including said impedance connecting said output electrode of said third transistor to said one low voltage source; electrical energy storage means connected in circuit with the common and input electrode of said second transistor and in circuit with said one low voltage source; said Geiger tube being effective upon being subjected to a condition to which it is sensitive to apply an input signal to said first transistor and to thereby cause said second and third transistors to become nonconductive and conductive respectively, said electrical energy storage means then being effective to maintain said second and third transistors nonconductive and conductive respectively for a relatively long time period independent of the time period of said input signal, and said third transistor being effective when rendered conductive to develop a low magnitude voltage across said impedance means for said relatively long time period, which voltage opposes the voltage of said first and second low voltage sources and thereby lowers the voltage applied to said Geiger tube to quench said Geiger tube.

9. Electric apparatus comprising; a nonself-quenching Geiger tube of the type requiring a relatively high operating voltage, a first and a second low voltage source, impedance means, circuit means connecting said Geiger tube, said impedance means and said first and second low voltage source in a series circuit to thereby apply the algebraic sum of said first and second low voltage sources to said Geiger tube and establish a relatively high operating voltage therefor; a first transistor network connected to said first low voltage source to receive operating voltage therefrom, a second transistor network connected to said second low voltage source to receive operating voltage therefrom, said first transistor network having an input connected to said Geiger tube and having an output connected to the input of said second transistor network, said Geiger tube being effective upon being subjected to a condition to which it is sensitive to apply an input signal to said first transistor network and cause said first transistor network to move from a first state of operation to a second state of operation, the output of said first transistor network thereupon being effective to cause said second transistor network to move from a first state of operation to a second state of operation, pulse stretching means connected in controlling relation to said first transistor network and effective to maintain said first transistor network in said second state of operation for a relatively long time period and thereby stretch the input signal received from said Geiger tube, and circuit means connecting the output of said second transistor network in circuit with said impedance means such that upon said second transistor network being placed in said second condition of operation, a relatively low magnitude voltage is developed across said impedance means for said relatively long time period, which voltage opposes the algebraic sum of said first and second low voltage sources and thereby lowers the operating voltage applied to said Geiger tube to quench said Geiger tube.

10. Electric apparatus comprising; a nonself-quenching Geiger tube of the type requiring a relatively high operating voltage, a first, second and third low voltage source, first and second impedance means, circuit means connecting said Geiger tube, said first and second impedance means and said first, second and third low voltage sources in series to thereby apply a relatively high operating voltage to said Geiger tube, said operating voltage being the algebraic sum of said first, second and third low voltage sources; a first transistor having an input electrode, an output electrode and a common electrode, a second transistor having an input electrode, an output electrode, and a common electrode, circuit means connecting said Geiger tube in controlling relation to the input and common electrodes of said first transistor to thereby cause said first transistor to assume a given condition of operation upon said Geiger tube being subjected to an ionizing condition; timing means associated with said first transistor in controlling relation thereto and effective to maintain said first transistor in said given state of conduction for a relatively long time period compared to the time period of the electrical signal received from said Geiger tube, circuit means connecting the common and output electrodes of said first transistor in circuit with the input and common electrodes of said second transistor and with said first impedance means and said first low voltage source, said first transistor being effective to render said second transistor conductive and to cause substantially the full voltage of said first voltage source to be dropped across said first impedance in opposition to said operating voltage and for said relatively long time period; circuit means connecting the output and common electrodes of said second transistor in series with said second impedance means and said second voltage source to thereby cause substantially the full voltage of said second source to be dropped across said second impedance means in opposition to said operating voltage and for said relatively long time period, the resulting operating voltage applied to said Geiger tube being reduced to substantially that of said third low voltage source to thereby quench said Geiger tube, and output means connected to one of said transistors.

11. Electric apparatus comprising; a nonself-quenching Geiger tube of the type requiring a relatively high operating voltage, a high voltage source, an impedance, circuit means connecting said Geiger tube, said impedance and said high voltage source in series to thereby apply a relatively high operating voltage to said Geiger tube; a voltage divider connected across said voltage source, a first, second and third transistor each having an input electrode, a common electrode, and an output electrode, biasing circuit means connecting the input and common electrodes of said first transistor to said voltage divider in a manner to render said first transistor normally conductive, further circuit means connecting the input and common electrodes of said second transistor to the output and common electrodes of said first transistor to render said second transistor normally nonconductive, circuit means connecting the output electrode of said second transistor in circuit with the common and input electrodes of said third transistor to a portion of said voltage divider to render said third transistor normally nonconductive, circuit means connecting the output electrode of said third transistor in circuit with said impedance to a portion of said voltage divider network; said Geiger tube being effective upon being subjected to an ionizing condition to cause said first transistor to be rendered nonconductive, whereupon said second and third transistors are rendered conductive to cause substantially the full voltage of said voltage divider to be developed across said impedance means in a manner to reduce the operating voltage of said Geiger tube and thereby quench said Geiger tube; and timer means associated with one of said transistors and effective to maintain said second and third transistors conductive for a relatively long time period to thereby establish a relatively long time period during which the Geiger tube is quenched.

References Cited in the file of this patent

UNITED STATES PATENTS

| | | |
|---|---|---|
| 2,721,276 | Exner | Oct. 18, 1955 |
| 2,749,447 | Smith | June 5, 1956 |
| 2,838,680 | Bender et al. | June 10, 1958 |
| 2,883,548 | Baker et al. | Apr. 21, 1959 |